United States Patent
Alghunaimi et al.

(10) Patent No.: US 10,882,024 B2
(45) Date of Patent: Jan. 5, 2021

(54) ADSORBENT POLYMERIC STRUCTURES FOR SEPARATING POLAR LIQUIDS FROM NON-POLAR HYDROCARBONS

(71) Applicants: Saudi Arabian Oil Company, Dhahran (SA); King Fahd University of Petroleum and Minerals, Dhahran (SA)

(72) Inventors: Fahd Ibrahim Alghunaimi, Dhahran (SA); Tawfik A. Saleh, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 220 days.

(21) Appl. No.: 16/199,833

(22) Filed: Nov. 26, 2018

(65) Prior Publication Data

US 2020/0164343 A1 May 28, 2020

(51) Int. Cl.
| | |
|---|---|
| B01J 20/26 | (2006.01) |
| C08K 3/04 | (2006.01) |
| B01J 20/20 | (2006.01) |
| B01J 20/28 | (2006.01) |
| B01J 20/30 | (2006.01) |
| C02F 1/28 | (2006.01) |
| C08F 2/22 | (2006.01) |
| C08F 12/08 | (2006.01) |
| C08K 3/26 | (2006.01) |
| C08K 9/02 | (2006.01) |
| C02F 101/32 | (2006.01) |
| C02F 103/36 | (2006.01) |

(52) U.S. Cl.
CPC ............ *B01J 20/265* (2013.01); *B01J 20/20* (2013.01); *B01J 20/28061* (2013.01); *B01J 20/3085* (2013.01); *C02F 1/288* (2013.01); *C08F 2/22* (2013.01); *C08F 12/08* (2013.01); *C08K 3/042* (2017.05); *C08K 3/26* (2013.01); *C08K 9/02* (2013.01); *B01J 2220/68* (2013.01); *C02F 2101/32* (2013.01); *C02F 2103/365* (2013.01); *C08K 2003/262* (2013.01)

(58) Field of Classification Search
CPC . B01J 20/26; B01J 20/265; B01J 20/20; B01J 20/28061; B01J 20/3085; B01J 2220/68; C08K 3/042; C08K 3/26; C08K 9/02; C08K 2003/262; C02F 1/288; C02F 2101/32; C02F 2103/365; C08F 2/22; C08F 12/08
USPC ........................................................ 502/402
See application file for complete search history.

(56) References Cited

U.S. PATENT DOCUMENTS

| | | |
|---|---|---|
| 4,591,441 A | 5/1986 | Sakai |
| 5,186,831 A | 2/1993 | DePetris |
| 5,374,600 A | 12/1994 | Hozumi et al. |
| 2013/0062285 A1 | 3/2013 | Hoek et al. |

FOREIGN PATENT DOCUMENTS

CN 108295811 A 7/2018

OTHER PUBLICATIONS

Fujita et al., "An onboard Vacuum Suction spilled Oil Recovery System", IEEE Techno-Ocean '04 (IEEE Cat No. 04CH37600), pp. 1458-1463, doi:10.1109/OCEANS.2004 1406335, 2006.
Schaum et al., "Screening Level Assessment of Risks Due to Dioxin Emissions from Burning Oil from the BP Deepwater Horizon Gulf of Mexico Spill", Environ. Sci. Technol. vol. 44, pp. 9383-9389, 2010.
Wang, Ben et al., "Biomimetic super-ly6ophobic and super-lyophilic materials applied for oil/water separation: a new strategy beyond nature", Chem. Soc. Rev. vol. 44, pp. 336-361, 2015.
Wang, Guowei et al., "Facile synthesis of flexible macroporous polypropylene sponges for separation of oil and water", Scientific Reports, 6:21265, DOI: 10.1038, pp. 1-6, Feb. 16, 2016.
Zhang et al., "Polyester Materials with Superwetting Silicone Nanofilaments for Oil/Water Separation and Selective Oil Adsorption", Adv. Funct. Mater., vol. 21, pp. 4699-4704, 2011.
Yang et al., "Surface roughness induced superhydrophobicity of graphene foam for oil-water separation", Journal of Colloid and Interface Science, vol. 508, pp. 254-262, Aug. 18, 2017.
Layek et al., "A review on synthesis and properties of polymer functionalized graphene", Polymer, vol. 54, No. 19, pp. 5087-5103, Aug. 1, 2013.
International Search Report and Written Opinion pertaining to Application No. PCT/US2019/056526 dated Jan. 29, 2020.

*Primary Examiner* — Edward M Johnson
(74) *Attorney, Agent, or Firm* — Dinsmore & Shohl LLP

(57) ABSTRACT

Adsorbent polymeric structures are described. These adsorbent polymeric structures are capable of separating non-polar hydrocarbons, such as crude oil or diesel fuel, from polar liquids, such as water. The adsorbent polymeric structures may include acid grafted graphene and at least one styrene. A method of preparing an adsorbent polymeric structure may include mixing graphene and at least one acid catalyst in a polar liquid in the presence of at least one alcohol to form an acid grafted graphene via an esterification reaction; and the acid grafted graphene and at least one styrene monomer are introduced to water in the presence of an initiator to form the adsorbent polymeric structure according to any of the previously-described embodiments via an emulsion polymerization reaction. Moreover, the adsorbent polymeric structures may be incorporated into methods of fluidly separating at least one non-polar hydrocarbon from a polar liquid.

15 Claims, 1 Drawing Sheet

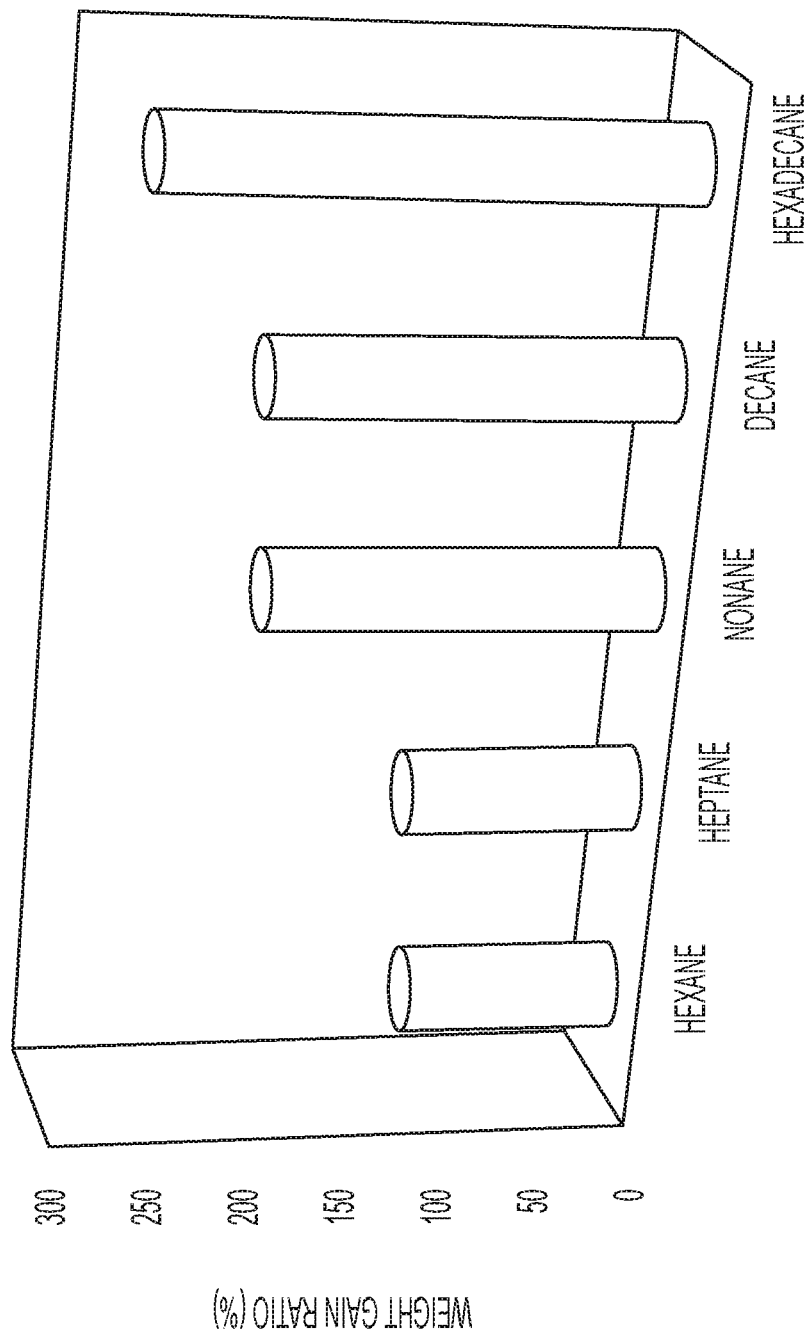

ADSORBENT POLYMERIC STRUCTURES FOR SEPARATING POLAR LIQUIDS FROM NON-POLAR HYDROCARBONS

TECHNICAL FIELD

The present specification generally relates to polymeric adsorbent materials that allow for the separation of polar liquids from non-polar hydrocarbons.

BACKGROUND

Oil spills and industrial organic pollutants have caused widespread water pollution that threatens ecological systems worldwide. Moreover, produced water treatment and wastewater reuse often produce environmentally-unfriendly fluids that require a reduction in oil content to meet fluid flooding specifications and environment regulations. To protect the environment from these threats, various materials have been developed that are able to remove oil from water.

These materials should display the properties of both hydrophobicity and oleophilicity that assist in removing oil from water. Such materials should also show high oil adsorption capacity, which may be indicated by a percent weight gain increase of over 100% when exposed to a non-polar hydrocarbon, as well as low water adsorption. However, current materials and methods of separation often cause adverse effects on the environment and have poor efficiency. For example, typical adsorbent materials that utilize spongy graphene show poor stability such that the spongy graphene agglomerates and thus efficiency is reduced.

SUMMARY

Accordingly, there are ongoing needs for materials that enhance the separation of oil from water. Embodiments of the present disclosure are directed to adsorbent polymeric structures that meet this need by exhibiting increased adsorption of non-polar hydrocarbons, such as crude oil, from polar liquids, such as water.

According to some embodiments of this disclosure, an adsorbent polymeric structure according to formula (I) is disclosed:

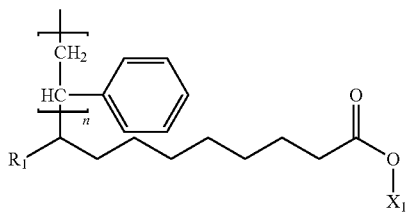

(I)

In formula (I), $X_1$ is a graphene-containing moiety having from 20 carbons to 100 carbons. The subscript n of formula (I) represents the number of repeating units of at least one styrene monomer substituent. In some embodiments, the subscript n is an integer ranging from 1 to 20. In formula (I), $R_1$ is an aliphatic moiety having from 5 carbons to 15 carbons, or from 7 to 11 carbons.

According to further embodiments, methods of preparing an adsorbent polymeric structure according to formula (I) are provided. The method includes mixing graphene and at least one acid catalyst in a polar liquid in the presence of at least one alcohol to form an acid grafted graphene via an esterification reaction. Once the acid grafted graphene is formed, the acid grafted graphene and at least one styrene monomer are introduced to water in the presence of an initiator to form the adsorbent polymeric structure according to any of the previously-described embodiments via an emulsion polymerization reaction. During the emulsion polymerization reaction, the initiator breaks a double bond of the acid grafted graphene to produce a reactive site. The styrene then polymerizes at the reactive site. In these embodiments, $R_1$ is an aliphatic moiety having 5 carbons to 15 carbons, n is an integer ranging from 1 to 20, and $X_1$ is a graphene-containing moiety includes from 20 carbons to 100 carbons.

According to some embodiments, methods of fluidly separating at least one non-polar hydrocarbon from a polar liquid include contacting an adsorbent polymeric structure according to formula (I) with the polar liquid including the at least one non-polar hydrocarbon and allowing the at least one non-polar hydrocarbon from the polar liquid to be at least partially adsorbed by the adsorbent polymeric structure, such that the at least one non-polar hydrocarbon is fluidly separated from the polar liquid.

Additional features and advantages of the embodiments described in this application will be set forth in the detailed description which follows, and in part will be readily apparent to those skilled in the art from that description or recognized by practicing the embodiments described in this application, including the detailed description which follows, the claims, as well as the appended drawing.

The accompanying drawing is included to provide a further understanding of the various embodiments, and is incorporated into and constitutes a part of this specification. The drawing illustrates the various embodiments described in this application, and together with the description serve to explain the principles and operations of the claimed subject matter.

BRIEF DESCRIPTION OF THE DRAWINGS

FIG. 1 is a graph illustrating the weight gain ratio of the adsorbent polymeric structure, according to embodiments for various non-polar hydrocarbons.

DETAILED DESCRIPTION

Recitations in the present disclosure of "at least one" component, element, constituent, compound, or other feature, should not be used to create an inference that the alternative use of the articles "a" or "an" should be limited to a single component, element, constituent, compound, or feature. For example, "an alcohol" may refer to one alcohol or more than one alcohol.

The term "esterification" may be defined as any suitable Fischer esterification reaction. Fischer esterification is an esterification reaction that includes refluxing a carboxylic acid and an alcohol in the presence of an acid catalyst. The reaction mechanism for such an esterification reaction includes (1) proton transfer from the acid catalyst to a carbonyl oxygen of the acid catalyst that increases electrophilicity of a carbonyl carbon; (2) the carbonyl carbon then reacts with a nucleophilic oxygen atom of the alcohol to form an oxonium ion; (3) proton transfer from the oxonium ion to a second molecule of the alcohol gives an activated complex; (4) protonation of one of the hydroxyl groups of the activated complex gives a new oxonium ion; and (5) loss of water from this oxonium ion and subsequent deprotonation produces an ester. In embodiments of the present specification, the acid catalyst may be an unsaturated fatty acid, such as 9-octadecenoic acid; the alcohol may be ethanol; and the carboxylic acid may be graphene. In embodiments, such a reaction produces an acid grafted graphene.

The term "emulsion polymerization" may be defined as a radical polymerization that typically begins with an emulsion, at least one monomer, and at least one initiator. The most common type of emulsion polymerization is an oil-in-water emulsion, in which droplets of the at least one monomer are emulsified with the at least one surfactant in a continuous phase of water. In embodiments, the at least one monomer may be a styrene monomer; the emulsion may be an acid grafted graphene; and the initiator may be any persulfate, such as potassium persulfate.

The term "grafted" may be defined as a covalently bonded polymer side chain of a compound, such as graphene. Similarly, grafting refers to the addition of polymer chains onto a surface.

The term "branched" may be defined as extending from a linear backbone defined by an aliphatic molecule, such as a fatty acid.

Oil removal from water is a process utilized in a variety of applications such as produced water treatment, waste water reuse, and oil removal from fresh and brackish waters. In produced water treatment, the oil contents must be reduced to nearly undetectable quantities in order to meet flooding fluid specifications and environmental regulations. Here, an adsorbent polymeric structure according to formula (I), as previously shown, is disclosed. This superhydrophobic/oleophilic structure effectively separates non-polar hydrocarbons, such as crude oil, from polar liquids, such as water. Here, the term "superhydrophobicity" is defined as a surface that is difficult to wet as the contact angles of a water droplet on a superhydrophobic material, such as the one described according to embodiments, exceed 150° and the sliding angle is less than 10°.

Accordingly, reference will now be made in detail to embodiments of adsorbent polymeric structures. Embodiments of methods for producing the adsorbent polymeric structures and methods for fluidly separating non-polar hydrocarbons from a polar liquid with the adsorbent polymeric structures will be subsequently disclosed.

The adsorbent polymeric structure will now be described. The adsorbent polymeric structure according to embodiments includes a polystyrene branched acid grafted graphene. It should be understood that in all representations of chemical structures in this disclosure, a wavy line drawn perpendicularly to a bond denotes a connection point of the chemical structure with another chemical structure or functional group and implies that the bond broken by the wavy line extends to another atom not shown in the representation.

In embodiments, the adsorbent polymeric structure may include an acid grafted graphene according to general formula (I):

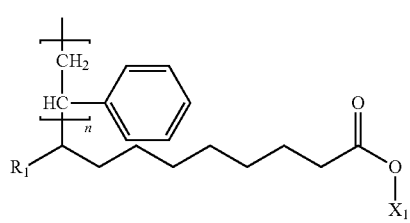

(I)

In formula (I), $X_1$ is a graphene-containing moiety having from 20 carbons to 100 carbons. The subscript n of formula (I) represents the number of repeating units of at least one styrene monomer substituent. In some embodiments, the subscript n is an integer ranging from 1 to 20. In formula (I), $R_1$ is an aliphatic moiety having from 5 carbons to 15 carbons.

In some embodiments, the graphene-containing moiety includes from 20 carbons to 100 carbons, from 25 carbons to 100 carbons, from 50 carbons to 100 carbons, from 75 carbons to 100 carbons, from 25 carbons to 75 carbons, from 50 carbons to 75 carbons, from 25 carbons to 50 carbons, or from any other suitable range between 25 carbons and 100 carbons.

In other embodiments, the graphene-containing moiety has a weight average molecular weight ranging from 500 grams per mole (g/mol) to 3,000 g/mol, from 750 g/mol to 2,500 g/mol, from 1,000 g/mol to 2,000 g/mol, or from any other suitable range between 500 g/mol and 3,000 g/mol.

In one or more embodiments, the graphene-containing moiety $X_1$ of the adsorbent polymeric material may be chosen from a graphene group having the general formula (Ia):

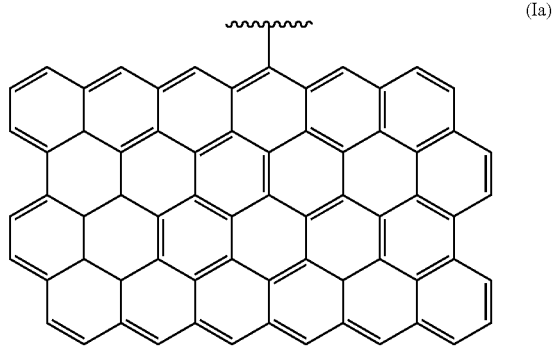

(Ia)

Referring again to formula (I), in embodiments, the subscript n representing the number of repeating units of the at least one styrene monomer substituent is an integer ranging from 1 to 20, from 1 to 15, from 1 to 10, from 1 to 8, from 2 to 15, from 3 to 10, from 4 to 7, or from any other suitable range between 1 and 20.

In other embodiments, the aliphatic moiety $R_1$ of formula (I) includes from 5 carbons to 25 carbons, 7 carbons to 25 carbons, from 9 carbons to 25 carbons, from 5 carbons to 15 carbons, from 7 carbons to 15 carbons, from 9 carbons to 15 carbons, from 5 carbons to 13 carbons, from 7 carbons to 13 carbons, from 9 carbons to 13 carbons, from 5 carbons to 11 carbons, from 7 carbons to 11 carbons, from 9 carbons to 11 carbons, from 5 carbons to 9 carbons, from 7 carbons to 9 carbons, or from any other suitable range between 5 carbons and 25 carbons. In certain embodiments, the aliphatic moiety has 9 carbons.

The adsorbent polymeric structure of formula (I), in embodiments, has a Brunauer-Emmett-Teller (BET) surface area of at least 50 square meters per gram ($m^2/g$). A greater BET surface area correlates to improved physical adsorption of gas molecules on a solid surface. As such, the BET surface area may be used to predict the number of available sites on the surface of the adsorbent polymeric structure of formula (I) for adsorbing non-polar hydrocarbons. In further embodiments, the adsorbent polymeric structure of formula (I) has a BET surface area of at least 75 $m^2/g$, at least 100

$m^2/g$, at least 150 $m^2/g$, at least 200 $m^2/g$, at least 250 $m^2/g$, or at least 300 $m^2/g$. In some embodiments, the adsorbent polymeric structure of formula (I) has a BET surface area from 50 $m^2/g$ to 300 $m^2/g$, from 75 $m^2/g$ to 300 $m^2/g$, from 100 $m^2/g$ to 300 $m^2/g$, from 150 $m^2/g$ to 300 $m^2/g$, from 200 $m^2/g$ to 300 $m^2/g$, from 250 $m^2/g$ to 300 $m^2/g$, or from any other suitable range between 50 $m^2/g$ and 300 $m^2/g$.

In an exemplary embodiment, the adsorbent polymeric structure may include an acid grafted graphene according to general formula (II):

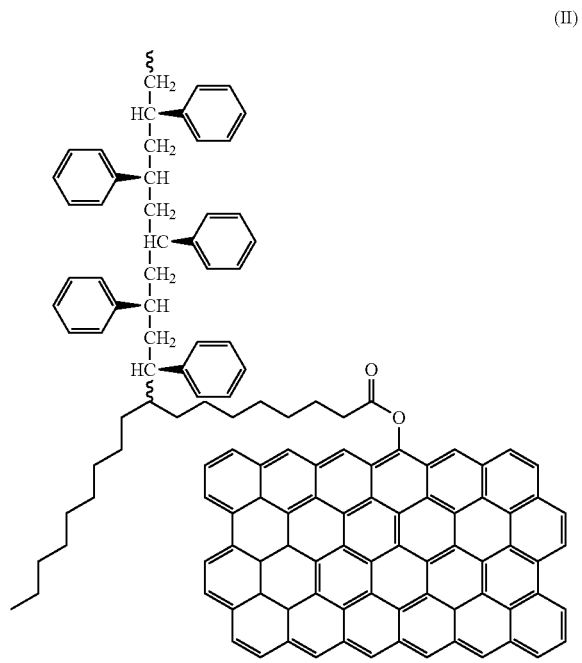

(II)

The adsorbent polymeric structures according to any of the previously-described embodiments may be prepared by any suitable chemical reaction or sequence of reactions. In a synthetic approach, graphene and at least one acid catalyst are mixed in a polar liquid in the presence of at least one alcohol to form an acid grafted graphene via an esterification reaction. Once the acid grafted graphene is formed, the acid grafted graphene and at least one styrene monomer are introduced to water in the presence of an initiator to form the adsorbent polymeric structure according to any of the previously-described embodiments via an emulsion polymerization reaction. During the emulsion polymerization reaction, the initiator breaks a double bond thereby producing a reactive site of the acid grafted graphene. The styrene then polymerizes at the reactive site. In these embodiments, $R_1$ is an aliphatic moiety having 5 carbons to 15 carbons, n is an integer ranging from 1 to 20, and $X_1$ is a graphene-containing moiety which includes from 20 carbons to 100 carbons.

In embodiments, graphene is esterified with the at least one acid catalyst to obtain an acid grafted graphene. Specifically, the hydroxyl group of the at least one acid catalyst interacts with the carboxylic group of the graphene via esterification. Then, emulsion polymerization of the at least one styrene monomer substituent is performed on the acid grafted graphene to produce the polystyrene branched acid grafted graphene.

Graphene improves the surface area of the adsorbent polymeric structures, according to embodiments, and also acts as a substrate for the growth of hydrophobic branches as it interacts with the at least one acid catalyst. The acid grafted graphene is functionalized with the at least one styrene through its double bond via in-situ emulsion polymerization. The adsorbent polymeric structures with increased ratios of the acid grafted graphene (versus styrene) by weight show improved uptake of non-polar hydrocarbons, thereby indicating efficient separation of oil and water.

The reaction mechanism for producing an acid grafted graphene according to general formula (II) is shown as:
Esterification (Reaction 1):

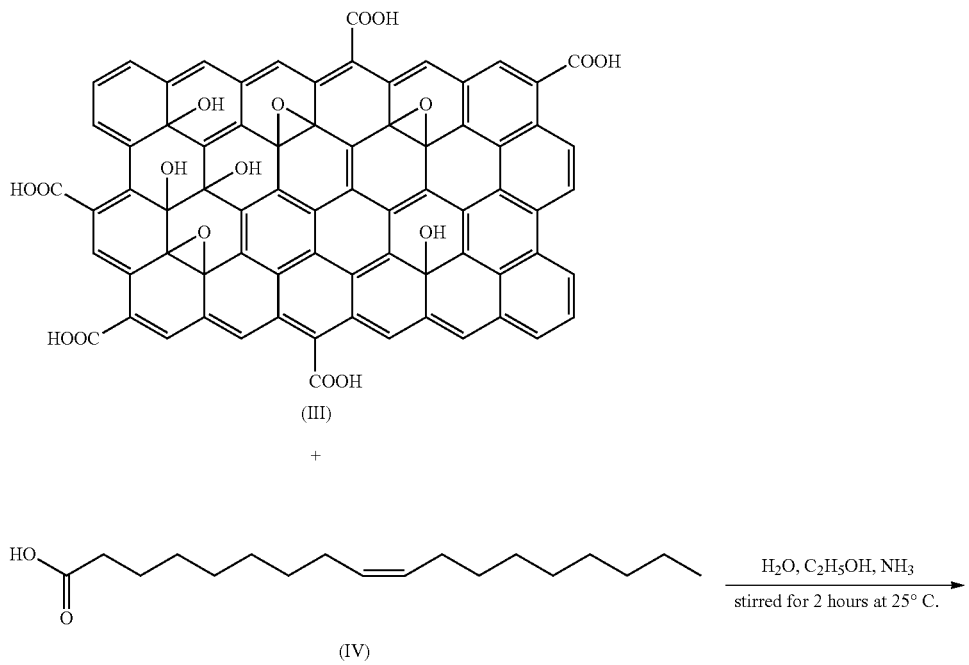

Emulsion Polymerization (Reaction 2):

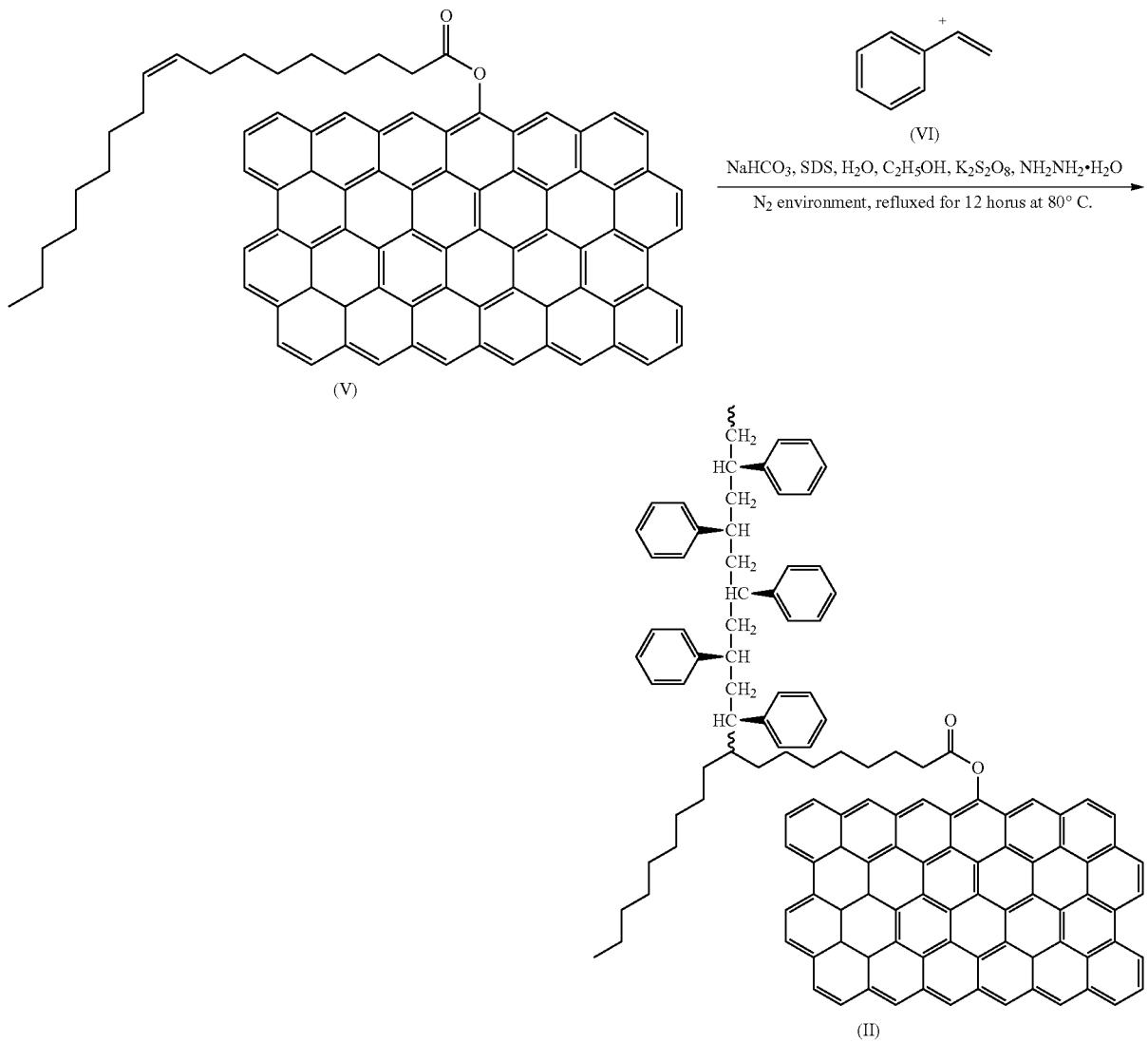

In Reaction 1, graphene, shown as general formula (III), is esterified with an acid catalyst (that is, 9-octadecenoic acid), shown as general formula (IV), to obtain an acid grafted graphene, shown as general formula (V). More specifically, in Reaction 1, the graphene is dispersed in a mixture of water and ethanol, and stirred at an ambient temperature of 25 degrees Celsius (° C.). Subsequently, an amount of ammonia is added, and the mixture is stirred again. The resulting mixture is centrifuged so as to separate the acid grafted graphene, which is then dried.

Then, in Reaction 2, emulsion polymerization of at least one styrene monomer substituent, shown as general formula (VI), is performed on the acid grafted graphene to produce the adsorbent polymeric structure, shown as general formula (II). More specifically, in Reaction 2, sodium bicarbonate and sodium dodecyl sulfate (SDS) are added to water in an inert environment—so as to eliminate oxygen—under stirring conditions. The acid grafted graphene and a styrene monomer are then added to the mixture. While still under an inert environment, an initiator (that is, potassium persulfate) is then added so as to initiate the polymerization of the styrene on the acid catalyst of the acid grafted graphene. The mixture is then heated to 80° C. and is stirred under reflux conditions. Then, an inorganic hydrate is added so as to partially reduce any oxidized sites on the acid grafted graphene. The mixture is then cooled to an ambient temperature, separated with a centrifuge, washed with water, and dried to produce the adsorbent polymeric structure, shown as general formula (II).

Referring still to the method of preparing the acid grafted graphene according any of the previous embodiments, the at least one acid catalyst includes any suitable omega fatty acids. Examples of suitable omega fatty acids include, but are not limited to unsaturated omega fatty acids omega fatty acids, such as omega-3 fatty acids, omega-5 fatty acids, omega-6 fatty acids, omega-7 fatty acids, omega-9 fatty acids, or combinations thereof. In some embodiments, the at least one fatty acid includes an omega-9 fatty acid, such as 9-octadecenoic acid.

The at least one alcohol may be a straight chain primary alcohol having the formula $C_xH_{2x+1}O$. In these embodiments, x is an integer ranging from 1 to 12, from 1 to 11, from 1 to 10, from 1 to 9, from 1 to 8, from 1 to 7, from 1 to 5, from 1 to 4, from 1 to 3, from 1 to 2, from 2 to 10, from 2 to 9, from 2 to 8, from 2 to 7, from 2 to 6, from 2 to 5, from 2 to 4, from 2 to 3, or any other suitable range between 1 and 12. In certain embodiments, the at least one alcohol includes a straight chain primary alcohol having the formula $C_2H_6O$, such as ethanol.

According to some embodiments, at least one inorganic amine is added during the esterification reaction so as to enhance the functionalization. Suitable inorganic amines include, but are not limited to, ammonia, ammonia borane, chloramine, dichloramine, hydroxylamine, nitrogen tribromide, nitrogen trichloride, nitrogen trifluoride, nitrogen triiodide, or combinations thereof. In certain embodiments, the at least one inorganic amine includes ammonia.

In embodiments, the polar liquid in which the graphene and the at least one acid catalyst are mixed during the esterification reaction includes any liquid including polar substances. The polar substances may include molecules that have a positive charge on one end of the molecule and a negative charge on the other end of the molecule. Examples of suitable polar liquids include, but are not limited to, water, methanol, ethanol, ammonia, or combinations thereof. In certain embodiments, the polar liquid includes water. In some embodiments, the polar liquid has a pH ranging from 5 to 10, from 6 to 9, from 6 to 8, or a pH of about 7.

Once the acid grafted graphene is formed from methods according to any of the preceding embodiments, the acid grafted graphene and at least one styrene monomer are introduced to water in the presence of an initiator to form the adsorbent polymeric structure according to formula (II) via emulsion polymerization.

In the emulsion polymerization reaction, the initiator initiates the polymerization by breaking the double bond of the acid grafted graphene (see the double bond in Reaction 2 for an illustration). This reactive site becomes present on the aliphatic chain of the at least one acid catalyst that is linked to the graphene once the bond is broken, such that the carbon is charged and therefore reactive. Upon breaking the double bond to form the reactive site, the at least one styrene monomer polymerizes at the reactive site. In certain embodiments, a surfactant maintains the orientation of the acid grafted graphene in the water during the emulsion polymerization reaction.

According to some embodiments, the initiator includes any oxyanion or its associated salts that includes peroxide units linked to one or more sulfur atoms. Suitable initiators include any oxidizing agents that may be used to initiate emulsion polymerizations. Examples of suitable persulfates include, but are not limited to, ammonium persulfate, sodium persulfate, potassium persulfate, or combinations thereof. In certain embodiments, the initiator includes potassium persulfate.

According to one or more embodiments, a buffer is added during the emulsion polymerization reaction so as to maintain the pH of the reaction. Suitable buffers include at least one ion salt such as sodium bicarbonate, sodium bisulfate, monosodium phosphate, disodium phosphate, or combinations thereof. In certain embodiments, the buffer includes sodium bicarbonate.

According to some embodiments, a surfactant is added during the emulsion polymerization reaction so as to reduce the surface tension of the water during the reaction. Suitable surfactants include anionic surfactants such as 2-acrylamido-2-methylpropane sulfonic acid, ammonium lauryl sulfate, ammonium perfluorononanoate, potassium lauryl sulfate, sodium alkyl sulfate, sodium dodecyl sulfate, sodium laurate, sodium laureth sulfate, sodium myreth sulfate, sodium pareth sulfate, sodium lauryl ether sulfate, or combinations thereof. In certain embodiments, the surfactant includes sodium dodecyl sulfate.

According to some embodiments, an inorganic hydrate is added during the emulsion polymerization reaction so as to partially reduce any unreacted sites on the acid grafted graphene. The inorganic hydrate includes any inorganic salt-containing water molecules. Suitable inorganic hydrates include, but are not limited to, hemihydrate, monohydrate, sesquihydrate, dihydrate, trihydrate, tetrahydrate, pentahydrate, hexahydrate, heptahydrate, or combinations thereof. In certain embodiments, the at least one inorganic hydrate includes hydrazine hydrate.

An amount of the at least styrene monomer and an amount of the acid grafted graphene may be added during the emulsion polymerization reaction in a fixed ratio. As the ratio of the amount of the acid grafted graphene increases, the surface area of the adsorbent polymeric structure also increases. Such a surface area increase may result in increased adsorption characteristics. In embodiments, the volume ratio of the acid grafted graphene to the at least styrene monomer is at least 2.5:1, at least 5:1, at least 7.5:1, or at least 10:1. In other embodiments, the volume ratio of the acid grafted graphene to the at least styrene monomer ranges from 2.5:1 to 10:1, from 2.5:1 to 7.5:1, from 5:1 to 10:1, from 5:1 to 7.5:1, from 7.5:1 to 10:1, or from any other suitable range between 2.5:1 and 10:1.

Thus, various embodiments of methods of preparing an adsorbent polymeric structure have been described. All of the components described may be procured from Sigma Aldrich (St. Louis, Mo.).

Embodiments of methods for fluidly separating a non-polar hydrocarbon from a polar liquid will now be described. The methods may include one or more than one adsorbent polymeric structure according to any of the embodiments previously described.

The adsorbent polymeric structures according to any of the previously-described embodiments may be incorporated into methods of fluidly separating at least one non-polar hydrocarbon from a polar liquid. In embodiments, an adsorbent polymeric structure according to formula (I) is contacted with the polar liquid including the at least one non-polar hydrocarbon. The polar liquid including the at least one non-polar hydrocarbon is then allowed to be at least partially adsorbed by the adsorbent polymeric structure, such that the at least one non-polar hydrocarbon is fluidly separated from the polar liquid. In certain embodiments, the polar liquid includes water.

In some embodiments, the at least one non-polar hydrocarbon includes crude oil, diesel fuel, or combinations thereof. The API of the at least one non-polar hydrocarbon, according to some embodiments, may range from 20° to 60°, from 24° to 60°, from 28° to 60°, from 32° to 60°, from 36° to 60°, from 40° to 60°, from 44° to 60°, from 48° to 60°, from 20° to 52°, from 24° to 52°, from 28° to 52°, from 32° to 52°, from 36° to 52°, from 40° to 52°, from 44° to 52°, from 20° to 52°, from 20° to 52°, from 20° to 40°, from 24° to 40°, from 28° to 40°, from 32° to 40°, from 36° to 40°, from 24° to 40°, from 20° to 33°, from 22° to 33°, from 24° to 33°, from 26° to 33°, from 28° to 33°, from 30° to 33°, from 20° to 32°, from 22° to 32°, from 24° to 32°, from 26° to 32°, from 28° to 32°, from 30° to 32°, or any other suitable range between 20° and 60°.

In some embodiments, the adsorbent polymeric structure of formula (I) has a weight gain ratio ranging from 100% to 300%. This ratio is calculated after the adsorbent polymeric structure of formula (I) is contacted with a non-polar hydrocarbon and is indicative of the structure's adsorption capacity. Such weight gain ratios indicate that the adsorbent polymeric structure of formula (I) is an efficient material for the adsorption of non-polar hydrocarbons. In certain embodiments, the weight gain ratio of the adsorbent polymeric structure of formula (I) is at least 100%, at least 110%, at least 120%, at least 130%, at least 140%, at least 150%, at least 160%, at least 170%, at least 180%, at least 190%, at least 200%, at least 210%, at least 220%, at least 230%, at least 240%, at least 250%, at least 260%, or at least 270%.

EXAMPLES

The following examples illustrate one or more additional features of the present disclosure described previously.

In the following examples, various adsorbent polymeric structures were prepared and tested for their suitability of fluidly separating non-polar hydrocarbons from water.

Generally, graphene was synthesized from waste graphite by a wet chemistry treatment process. Graphene was prepared by introducing 20 grams (g) of waste graphite and 6 g of sodium nitrate into a mixture of 200 milliliters (mL) of sulfuric acid and 200 mL of nitric acid in a 1 liter (L) round-bottom flask with stirring in an ice bath. Then, 10 g of sodium persulfate was introduced to the round-bottom flask at continuous intervals, under continuous stirring. Once the mixture has reacted for 8 hours under stirring, 200 mL of distilled water was added dropwise to the round-bottom flask. The mixture was then kept at 90° C. for 24 hours. After the mixture cooled, hydrogen peroxide (30%) was added dropwise until the color of the mixture turned dark yellow. The contents of the round-bottom flask were further stirred for 3 hours at room temperature. After stirring, the contents of the round-bottom flask were then centrifuged at 10,000 rpm to obtain graphene oxide.

The graphene oxide was then dispersed in a 3:1 mixture by weight of water and ethanol. Then, 5 mL of oleic acid was added to the mixture under vigorous stirring for 2 hours at room temperature. 5 mL of 1 molar (M) ammonia was added to the mixture and kept under stirring for an additional 12 hours. The mixture was again centrifuged at 10,000 revolutions per minute (rpm) to obtain acid grafted graphene.

Once the acid grafted graphene was obtained, 0.2 g of sodium bicarbonate, 0.2 g of sodium dodecyl sulfate, and 150 mL of water were added to a necked flask under stirring in an inert environment of nitrogen for six hours. Then, the acid grafted graphene, which was dissolved in ethanol, and 10 mL of styrene monomer were introduced to the necked flask. Under the inert environment of nitrogen, 0.4 g of potassium persulfate was added dropwise in order to initiate the polymerization of styrene on the chain of the acid grafted graphene. The mixture was kept under stirring at 80° C. for 6 hours under reflux. After the stirring was completed, 5 mL of hydrazine hydrate was added dropwise to the necked flask to partially reduce the unreacted graphene sites. The contents of the necked flask were stirred under reflux for an additional 6 hours. The mixture was cooled and the obtained adsorbent polymeric structure was separated, washed, and dried.

Three adsorbent polymeric structures were created according to the previously-described method. The first adsorbent polymeric structure ("Structure 1") was synthesized using 25 mg of the acid grafted graphene. The second adsorbent polymeric structure ("Structure 2") was synthesized using 50 mg of the acid grafted graphene. The third adsorbent polymeric structure ("Structure 3") was synthesized using 75 mg of the acid grafted graphene.

The three structures were characterized by a $N_2$-physisorption Brunauer-Emmett-Teller (BET) surface area analyzer. Structure 1 was found to have a BET surface area of 79 $m^2/g$, Structure 2 was found to have a BET surface area of 225 $m^2/g$, and Structure 3 was found to have a BET surface area of 288 $m^2/g$.

Hydrophobic performance of three structures was evaluated using the emulsion of various non-polar hydrocarbons and methylene-colored water. The different emulsions were prepared by mixing 0.5 mL of a non-polar hydrocarbon into 4.5 mL of methylene-colored water. The non-polar hydrocarbons tested were hexane, heptane, nonane, decane, and hexadecane. To prepare the various emulsions, one non-polar hydrocarbon and the methylene-colored water were introduced to a test tube and vigorously shaken. After sufficient mixing, the adsorbent polymeric structure according to any of the previously described embodiments was added to the test tube. The ability of the adsorbent polymeric structure to adsorb the non-polar hydrocarbon from the methylene-colored water was evaluated at 1 minute, 5 minutes, 45 minutes, and 60 minutes.

The adsorbing capability of Structure 1 was found to be suitable for adsorbing the tested non-polar hydrocarbons. However, the adsorbing capability of Structure 2 was much improved due to the increased amount of grafted graphene present in the structure. For example, Structure 2 was able to adsorb all of the heptane present in the test tube within 5 minutes. Moreover, Structure 3 displayed enhanced efficiency over Structure 2, as it was able to adsorb all of the heptane present in the test tube in less than one minute. It is clear that increasing the amount of grafted graphene present in the structure leads to the structure's increased adsorption capabilities.

To gain insight into the effect that the length of the non-polar hydrocarbon has on the adsorption properties of the adsorbent polymeric structures, various amounts of Structure 3 were tested with various non-polar hydrocarbon emulsions. To prepare these emulsions, 0.5 mL of the non-polar hydrocarbon was added to 4.5 mL of methylene-colored water in a test tube. Then, various amounts of Structure 3 were added to the test tube. Specifically, 0.05 g of Structure 3, 0.1 g of Structure 3, 0.2 g of Structure 3, and 0.3 g of Structure 3 were added to different emulsions. The results showed that as the amount of Structure 3 added to the test tube increased, the amount of time it took Structure 3 to adsorb the non-polar hydrocarbon decreased. An amount of 0.3 g of Structure 3 was enough to completely adsorb hexane, heptane, nonane, decane, and hexadecane within 2 to 10 minutes of agitation. Further, it was also evident from the tests that Structure 3 began to swell, which indicates that the non-polar hydrocarbon has adsorbed onto the polymeric structure.

Structure 3 was further tested for its adsorption capacity of the various non-polar hydrocarbons by weight gain ratio. Structure 3 displayed excellent adsorption capabilities for the various non-polar hydrocarbons. Specifically, the material weight gain ratio of Structure 3 was found to range from 111% for hexane to 271% for hexadecane. These results can be seen in FIG. 1, which shows that the larger the carbon alkane test, the greater the adsorption. As such, Structure 3 can be used for multiple adsorptions of the various non-polar hydrocarbons.

From these results, it is clear the adsorbent polymeric structures according to embodiments of this application demonstrate efficient adsorption of non-polar hydrocarbons. The at least one acid catalyst used to form the adsorbent polymeric structures acts as both a linker between the acid grafted graphene and the polystyrene, and its long chain increases the hydrophobicity of the structure. Moreover, the at least one acid catalyst functions as a spacer between the branches of the polystyrene. By increasing the concentration of the acid grafted graphene of the adsorbent polymeric structures, more reactive sites and branches are generated, thereby providing an increased surface area to aid in adsorption of the non-polar hydrocarbons.

According to a first aspect of the present disclosure, an adsorbent polymeric structure according to formula (I), as described in this disclosure, is disclosed. In this aspect, $X_1$ is a graphene-containing moiety having from 20 carbons to 100 carbons. The subscript n of formula (I) represents the number of repeating units of at least one styrene monomer substituent. In some embodiments, the subscript n is an integer ranging from 1 to 20. In formula (I), $R_1$ is an aliphatic moiety having from 5 carbons to 15 carbons, or from 7 to 11 carbons.

A second aspect of the present disclosure may include the first aspect, in which the aliphatic moiety $R_1$ has 9 carbons.

A third aspect of the present disclosure may include the first aspect or the second aspect, in which n is an integer with a value of 5.

A fourth aspect of the present disclosure may include any of the first through third aspects, in which $X_1$ is a graphene-containing moiety having from 25 carbons to 75 carbons.

A fifth aspect of the present disclosure may include any of the first through fourth aspects, in which the adsorbent polymeric structure according to formula (I) has a BET surface area of at least 250 m$^2$/g.

A sixth aspect of the present disclosure may include any of the first through fifth aspects, in which the graphene-containing moiety $X_1$ of the adsorbent polymeric material includes a graphene group having the general formula (Ia), as described in this disclosure.

According to a seventh aspect of the present disclosure, a method of preparing an adsorbent polymeric structure according to formula (I), as described in this disclosure, includes mixing graphene and at least one acid catalyst in a polar liquid in the presence of at least one alcohol to form an acid grafted graphene via esterification; and introducing the acid grafted graphene and at least one styrene monomer to water in the presence of an initiator to form the adsorbent polymeric structure according to formula (I), as described in this disclosure, via emulsion polymerization. In this embodiment the initiator breaks a double bond of the acid grafted graphene to produce a reactive site; the at least one styrene monomer polymerizes at the reactive site; R1 is an aliphatic moiety having 5 carbons to 15 carbons; n is an integer ranging from 1 to 20; and $X_1$ is a graphene-containing moiety includes from 20 carbons to 100 carbons.

An eighth aspect of the present disclosure may include the seventh aspect, in which the initiator includes ammonium persulfate, sodium persulfate, potassium persulfate, or combinations thereof.

A ninth aspect of the present disclosure may include the seventh aspect or the eighth aspect, in which the at least one alcohol includes a straight chain primary alcohol having the formula $C_xH_{2x+1}O$ and x is an integer ranging from 1 to 12.

A tenth aspect of the present disclosure may include any of the seventh through ninth aspects, in which the at least one alcohol includes ethanol.

An eleventh aspect of the present disclosure may include any of the seventh through tenth aspects, in which a buffer including at least one ion salt is added during the emulsion polymerization reaction.

A twelfth aspect of the present disclosure may include any of the seventh through eleventh aspects, in which the at least one ion salt includes sodium bicarbonate.

A thirteenth aspect of the present disclosure may include any of the seventh through twelfth aspects, in which a surfactant is added during the emulsion polymerization reaction.

A fourteenth aspect of the present disclosure may include any of the seventh through thirteenth aspects, in which the surfactant includes sodium dodecyl sulfate.

A fifteenth aspect of the present disclosure may include any of the seventh through fourteenth aspects, in which the polar liquid includes water.

A sixteenth aspect of the present disclosure may include any of the seventh through fifteenth aspects, in which $X_1$ is a graphene-containing moiety having from 25 carbons to 75 carbons.

A seventeenth aspect of the present disclosure may include any of the seventh through sixteenth aspects, in which the adsorbent polymeric structure according to formula (I) has a BET surface area of at least 250 m$^2$/g.

An eighteenth aspect of the present disclosure may include any of the seventh through seventeenth aspects, in which the graphene-containing moiety $X_1$ of the adsorbent polymeric material includes a graphene group having the general formula (Ia), as described in this disclosure.

According to a nineteenth aspect of the present disclosure, a method of fluidly separating at least one non-polar hydrocarbon from a polar liquid includes contacting an adsorbent polymeric structure according to formula (I), as described in this disclosure, with the polar liquid including the at least one non-polar hydrocarbon; and allowing the polar liquid including the at least one non-polar hydrocarbon to be at least partially adsorbed by the adsorbent polymeric structure, such that the at least one non-polar hydrocarbon is fluidly separated from the polar liquid. In this aspect, $R_1$ is an aliphatic moiety having 5 to 15 carbons; n is an integer ranging from 1 to 20; and $X_1$ is a graphene-containing moiety includes from 20 carbons to 100 carbons.

A twentieth aspect of the present disclosure may include the nineteenth aspect, in which the at least one non-polar hydrocarbon includes crude oil, diesel fuel, or combinations thereof.

A twenty first aspect of the present disclosure may include the nineteenth aspect or the twentieth aspect, in which the at least one non-polar hydrocarbon has an API gravity ranging from 20° to 60°.

A twenty second aspect of the present disclosure may include any of the nineteenth aspect through the twenty first aspects, in which the polar liquid includes water.

A twenty third aspect of the present disclosure may include any of the nineteenth aspect through the twenty second aspects, in which the adsorbent polymeric structure according to formula (I) has a BET surface area of at least 250 m$^2$/g.

A twenty fourth aspect of the present disclosure may include any of the nineteenth aspect through the twenty third aspects, in which the adsorbent polymeric structure according to formula (I) has a weight gain ratio ranging from 100% to 300%.

A twenty fifth aspect of the present disclosure may include any of the nineteenth aspect through the twenty fourth aspects, in which $X_1$ is a graphene-containing moiety having from 25 carbons to 75 carbons.

For the purposes of describing and defining the presently described subject matter, it is noted that reference in this application to a characteristic of the subject matter of the present disclosure being a "function of" a parameter, variable, or other characteristic is not intended to denote that the characteristic is exclusively a function of the listed parameter, variable, or characteristic. Rather, reference in this application to a characteristic that is a "function" of a listed parameter or variable is intended to be open ended such that the characteristic may be a function of a single parameter or a variable, or a plurality of parameters or variables.

It is noted that the term "typically," when utilized in this application, is not utilized to limit the scope of the claimed subject matter or to imply that certain features are critical, essential, or even important to the structure or function of the claimed subject matter. Rather, the term "typically" is merely intended to identify particular aspects of an embodiment of the present disclosure or to emphasize alternative or additional features that may or may not be utilized in a particular embodiment of the present disclosure.

It is noted that one or more of the following claims utilize the term "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended term "wherein."

For the purposes of describing and defining the present subject matter it is noted that the term "about" is utilized in this application to represent the inherent degree of uncertainty that may be attributed to any quantitative comparison, value, measurement, or other representation. The term "about" is also utilized in this application to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed in this application should not be taken to imply that these details relate to elements that are essential components of the various embodiments described in this application, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified in this application as particularly advantageous, it is contemplated that the present disclosure is not necessarily limited to these aspects.

What is claimed is:

1. An adsorbent polymeric structure according to formula (I):

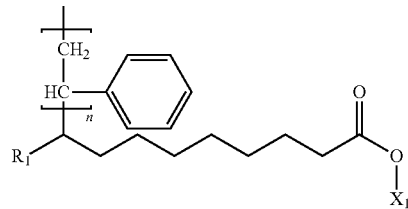

in which
  $R_1$ is an aliphatic moiety having from 5 carbons to 15 carbons;
  n is an integer ranging from 1 to 20; and
  $X_1$ is a graphene-containing moiety having from 20 carbons to 100 carbons.

2. The adsorbent polymeric structure of claim 1, in which the aliphatic moiety $R_1$ has 9 carbons.

3. The adsorbent polymeric structure of claim 1, in which n is an integer with a value of 5.

4. The adsorbent polymeric structure of claim 1, in which $X_1$ is a graphene-containing moiety having from 25 carbons to 75 carbons.

5. The adsorbent polymeric structure of claim 1, in which the adsorbent polymeric structure according to formula (I) has a BET surface area of at least 250 $m^2/g$.

6. The adsorbent polymeric structure of claim 1, in which the graphene-containing moiety $X_1$ of the adsorbent polymeric material comprises a graphene group having the general formula (Ia):

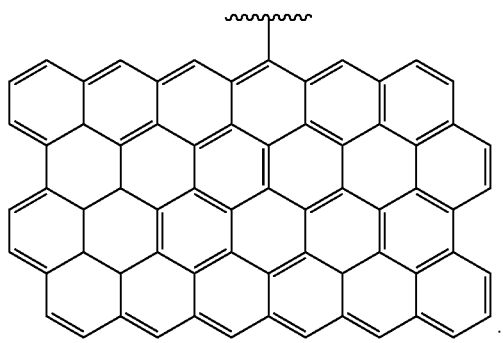

7. A method of preparing an adsorbent polymeric structure according to formula (I):

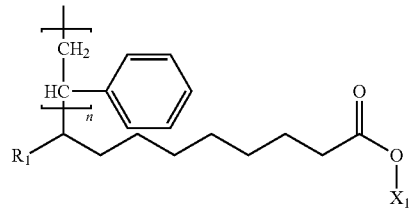

the method comprising:
  mixing graphene and at least one acid catalyst in a polar liquid in the presence of at least one alcohol to form an acid grafted graphene via esterification; and introducing the acid grafted graphene and at least one styrene monomer to water in the presence of an initiator to form the adsorbent polymeric structure according to formula (I) via emulsion polymerization, in which:

the initiator breaks a double bond of the acid grafted graphene to produce a reactive site;

the at least one styrene monomer polymerizes at the reactive site;

$R_1$ is an aliphatic moiety having 5 carbons to 15 carbons;

n is an integer ranging from 1 to 20; and $X_1$ is a graphene-containing moiety includes from 20 carbons to 100 carbons.

8. The method of claim 7, in which the initiator comprises ammonium persulfate, sodium persulfate, potassium persulfate, or combinations thereof.

9. The method of claim 7, in which the at least one alcohol comprises a straight chain primary alcohol having the formula $C_xH_{2x+1}O$ and x is an integer ranging from 1 to 12.

10. The method of any of claim 7, in which a buffer comprising at least one ion salt comprising sodium bicarbonate is added during the emulsion polymerization reaction.

11. The method of claim 7, in which a surfactant comprising sodium dodecyl sulfate is added during the emulsion polymerization reaction.

12. The method of claim 7, in which the graphene-containing moiety $X_1$ of the adsorbent polymeric material comprises a graphene group having the general formula (Ia):

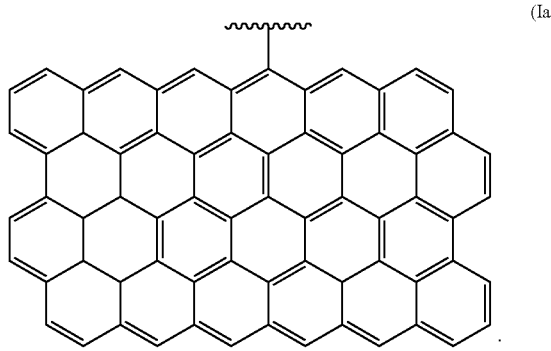

(Ia)

13. A method of fluidly separating at least one non-polar hydrocarbon from a polar liquid, the method comprising contacting an adsorbent polymeric structure according to formula (I):

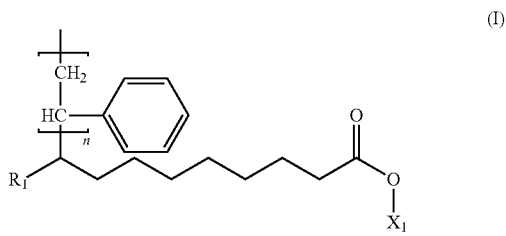

(I)

with the polar liquid comprising the at least one non-polar hydrocarbon; and allowing the polar liquid comprising the at least one non-polar hydrocarbon to be at least partially adsorbed by the adsorbent polymeric structure, such that the at least one non-polar hydrocarbon is fluidly separated from the polar liquid, in which:

$R_1$ is an aliphatic moiety having 5 to 15 carbons;

n is an integer ranging from 1 to 20; and $X_1$ is a graphene-containing moiety includes from 20 carbons to 100 carbons.

14. The method of claim 13, in which the at least one non-polar hydrocarbon comprises crude oil, diesel fuel, or combinations thereof and the at least one non-polar hydrocarbon has an API gravity ranging from 20° to 60°.

15. The method of claim 13, in which the adsorbent polymeric structure according to formula (I) has a BET surface area of at least 250 $m^2/g$ and a weight gain ratio ranging from 100% to 300%.

\* \* \* \* \*